United States Patent
Challoner et al.

(10) Patent No.: US 6,675,630 B2
(45) Date of Patent: Jan. 13, 2004

(54) MICROGYROSCOPE WITH ELECTRONIC ALIGNMENT AND TUNING

(75) Inventors: A. Dorian Challoner, Manhattan Beach, CA (US); Roman C. Gutierrez, La Crescenta, CA (US)

(73) Assignee: The Boeing Company, Chicago, IL (US)

( * ) Notice: Subject to any disclaimer, the term of this patent is extended or adjusted under 35 U.S.C. 154(b) by 180 days.

(21) Appl. No.: 09/932,796

(22) Filed: Aug. 17, 2001

(65) Prior Publication Data

US 2003/0101814 A1 Jun. 5, 2003

(51) Int. Cl.[7] .................. G01C 17/38; G01C 19/00
(52) U.S. Cl. .................. 73/1.77; 73/1.82; 73/504.02
(58) Field of Search .................. 73/1.77, 1.82, 73/504.02

(56) References Cited

U.S. PATENT DOCUMENTS 5,894,090 A * 4/1999 Tang et al. .............. 73/504.02

* cited by examiner

*Primary Examiner*—Richard A. Moller
(74) *Attorney, Agent, or Firm*—Terje Gudmestad

(57) ABSTRACT

A micro-gyroscope having electronic alignment by performing an electronic coordinate transformation on control voltages ($V_{Tx}$, $V_{Ty}$) through an attenuator network thereby canceling first and second harmonic signals from the output ($V_{thx}$, $V_{thy}$). The micro-gyroscope is tuned by automatic electronic compensation based on quadrature error that is applied to correct for variations in the gyroscope.

13 Claims, 2 Drawing Sheets

MICROGYROSCOPE WITH ELECTRONIC ALIGNMENT AND TUNING

GOVERNMENT INTEREST

This invention was made with government support. The government has certain rights in this invention.

TECHNICAL FIELD

The present invention relates to micro-machined electromechanical systems, and more particularly to a MEMS vibratory gyroscope having electronic tuning and alignment.

BACKGROUND ART

Micro-gyroscopes are used in many applications including, but not limited to, communications, control and navigation systems for both space and land applications. These highly specialized applications need high performance and cost effective micro-gyroscopes.

There is known in the art a micro-machined electromechanical vibratory gyroscope designed for micro-spacecraft applications. The gyroscope is explained and described in a technical paper entitled "Silicon Bulk Micro-machined Vibratory Gyroscope" presented in June, 1996 at the Solid State Sensors and Actuator Workshop in Hilton Head, S.C., and in U.S. Pat. No. 5,894,090.

A typical gyroscope has a resonator having a "cloverleaf" structure consisting of a rim, four silicon leaves, and four soft supports, or cantilevers, made from a single crystal silicon. The four supports provide mechanical support and restoring force for the harmonic motion of the structure. A metal baton is rigidly attached to the center of the resonator, in a plane perpendicular to the plane of the silicon leaves, and to a quartz base plate spaced apart from the silicon leaves. The quartz base plate has a pattern of electrodes that coincides with the cloverleaf pattern of the silicon leaves. The electrodes include two drive electrodes and two sense electrodes.

The micro-gyroscope is electrostatically actuated and the sense electrodes capacitively detect Coriolis induced motions of the silicon leaves. The micro-gyroscope has a low resonant frequency due to the large mass of the metal post and the soft cantilevers. The response of the gyroscope is inversely proportional to the resonant frequency. Therefore, a low resonant frequency increases the responsivity of the device.

The cloverleaves provide large areas for electrostatic driving and capacitance sensing. Applying an AC voltage to capacitors that are associated with the drive electrodes excites the resonator. This excites the rotation $T_x$ about the drive axis and rocking-like displacement $T_y$ for the leaves.

Because the post is rigidly attached to the leaves, the rocking movement of the leaves translates to movement of the baton. When the leaves oscillate in the drive mode, the displacement of the post is near parallel to the leaf surface in the y-direction. When a rotation rate is applied about the z-axis, Coriolis force acts on the oscillating post and causes its displacement in the x-direction. The baton displacement is translated back into the rocking motion, $T_y$, of the leaves. The baton provides large Coriolis coupling that transfers energy between the two orthogonal rocking modes.

The control electronics associated with the micro-gyroscope include an actuation circuit that is essentially an oscillator around the micro-gyroscope that locks onto the drive resonance mode. The signals from the sense electrodes are summed to remove the differential signal between them and the response of the sense resonance from the feedback loop. On the other hand, the sense circuit subtracts the signals from the sense electrodes to remove the common-mode drive signal.

Micro-gyroscopes are subject to electrical interference that degrades performance with regard to drift and scale factor stability. Micro-gyroscopes often operate the drive and sense signals at the same frequency to allow for simple electronic circuits. However, the use of a common frequency for both functions allows the relatively powerful drive signal to inadvertently electrically couple to the relatively weak sense signal.

Typically, prior art micro-gyroscopes are open loop and untuned. If the drive frequency is tuned closely to a high Q sense axis resonance, large mechanical gain and low sensitivity to sensor noise is possible. High Q also results in low rate drift.

However, close tuning leads to large uncertainty in the gain and phase of the open-loop response. Phase variations lead to added rate drift errors due to quadrature signal pickup and the gain variations lead to rate scale factor errors. Operating the open-loop micro-gyroscope in a closely tuned manner results in higher scale factor error, higher rate errors due to mechanical phase shifts, and slower response with sensitive lightly damped resonances. Additionally, the response time of the open-loop micro-gyroscope is proportional to the damping time constant, Q, of the sense resonance. To reduce rate drift, very long natural damping time constants are required, slowing the response time.

If the drive frequency is tuned closely to a high Q sense axis resonance, a force-to-rebalance method that incorporates complex demodulators and modulators in multiple re-balance loops is necessary. The modulators and demodulators provide coherent feedback only for signals modulating the drive frequency, and therefore do not provide active damping of independent sense resonance vibrations. These vibrations, if not exactly matched to the drive frequency, are not actively damped resulting in false rate signals or noise.

Noise and drift in the electronic circuit limit micro-gyroscope performance. Therefore, prior art micro-gyroscopes perform poorly and are unreliable in sensitive space applications. Previous open loop operation is intentionally split between two rocking mode frequencies. Therefore, the rocking mode axes tend to align with the spring axes and electrode sense and control axes.

Closed loop control enables close tuning of the rocking modes. However, residual imbalances result in non-alignment of rocking mode axes with electrode axes. This produces a large quadrature error signal and second harmonics on the output axis sensor which limits the amount of amplification and closed loop gain that can be applied. The large quadrature error signal also causes false rate indications due to phase errors in the demodulation. The lack of tuning of the two modes due to mismatch of the spring reduces the sensor mechanical gain and increases rate noise.

SUMMARY OF THE INVENTION

The present invention is a method for electronically aligning the sense and control axes with the modal axes and tuning the drive frequency to the sense mode frequency by adjusting the AGC loop phase. Cloverleaf micro-gyroscopes typically employ a control circuit that is electrically coupled to the electrodes. The circuit provides drive signals to drive electrodes to oscillate the leaf structure and to receive a sensing signal from the sensing electrodes to detect response of the oscillating leaf structure to external physical phenomena.

In the present invention, an electronic coordinate transformation is performed on the control voltages and on the sense voltages using an attenuator network, electronically aligning the drive and sense axes of the micro-gyroscope.

The micro-gyroscope is electronically tuned by virtue of design symmetry and precise manufacture. However, slight temperature or pressure variations may lead to tuning or alignment variations and bias drift. The present invention provides electronic compensation based on quadrature error to correct for these variations.

It is an object of the present invention to improve the aligning and tuning of rocking mode Coriolis micro-gyroscopes. It is another object of the present invention to electronically align the sense and control axes by way of electronic adjustments.

It is a further object of the present invention to tune the drive and sense mode frequencies by adjustment of the AGC loop.

Other objects and features of the present invention will become apparent when viewed in light of the detailed description of the preferred embodiment when taken in conjunction with the attached drawings and appended claims.

BRIEF DESCRIPTION OF THE DRAWINGS

In order that the invention may be well understood, there will now be described, an embodiment thereof, given by way of example, reference being made to the accompanying drawings, in which.

BEST MODE(S) FOR CARRYING OUT THE INVENTION

In general, vibratory micro-gyroscopes have a rotation sensing mechanical element that is initially driven to oscillate in an input, or drive mode. Under rotation, Coriolis acceleration induces energy transfer from the input mode to a second oscillatory mode, typically termed an output or sense mode, which causes the sensing element to be excited. Optimum performance is achieved when the oscillatory modes, the drive and sense modes, have the same resonant frequency and a high quality, or Q factor. The response to the Coriolis acceleration is then mechanically amplified by the Q factor of the resonance.

Figure 1:
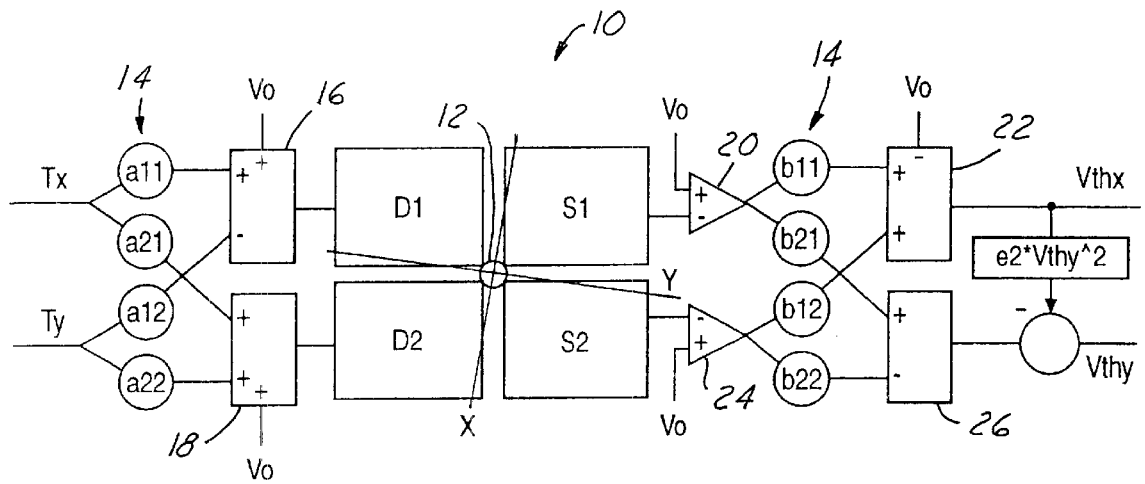
FIG. 1 is a block diagram of the electronics associated with aligning the electrical and mechanical axes of a cloverleaf micro-gyroscope according to the present invention.

FIG. 1 is a block diagram of the electronic alignment circuit 10 of the present invention as it is applied to a cloverleaf micro-gyroscope having four leaves (not shown).

It should be noted that while a four-leaf micro-gyroscope is described herein by way of example, it is also possible to substitute another symmetric, planar pattern. For example, a six or eight leaf clover pattern may be used, or another more complex pattern. It should also be noted that the functions described by the present invention may be implemented in analog electronics or a digital signal processor.

Referring still to FIG. 1, a set of four electrodes including two drive electrodes, D1 and D2 and two sense electrodes, S1 and S2 are shown. The electrodes D1, D2, S1, and S2 are located beneath silicon cloverleaves (not shown) that are connected to each other by a post 12. Post 12 is located perpendicular to the plane of the electrodes D1, D2, S1, and S2. It should be noted that the electrodes D1, D2, S1, and S2 are not electrically connected to the cloverleaves (not shown) or the post 12.

A drive voltage $V_{Tx}$ is used to apply electrostatic torques along the principal mechanical x-axis at a drive mode frequency $Z_x$. The drive voltage establishes sinusoidal motion that is capacitively measured by $V_{thx}$. The gyroscope rate output is proportional to the inertial rate about the input axis, also known as the mechanical z-axis, and the drive motion amplitude rotation about the drive axis, also known as the mechanical x-axis. The resulting Coriolis force produces motion about the principal mechanical y-axis, or sense axis, that is sensed by $V_{thy}$.

A drive voltage $V_{Ty}$ is used to apply electrostatic torques along the principal mechanical y-axis at a drive mode frequency $Z_y$. The drive voltage establishes sinusoidal motion that is capacitively measured by $V_{thy}$.

The signals $V_{Tx}$ and $V_{Ty}$ are subtracted 16 to provide a drive signal to D1. The signals $V_{Tx}$ and $V_{Ty}$ are summed 18 to provide a drive signal to D2. The sense electrode, S1, senses the motion of the micro-gyroscope and provides a signal that is amplified 20, and summed 22 with a signal from sense electrode S2 to provide sense output signal $V_{thx}$. Sense electrode S2 senses a signal that is amplified 24, and subtracted 26 from the amplified sensed signal from S1 to provide the output signal $V_{thy}$.

Because of microfabrication limitations, the principal mechanical axes of the two vibratory rocking modes cannot be aligned with the electrode axes. Thus, an electronic coordinate transformation is performed on the control voltages, $V_{Tx}$ and $V_{Ty}$, using an attenuator network 14.

The attenuator network 14, as shown in FIG. 1 has attenuators $a_{11}$, $a_{21}$, $a_{12}$ and $a_{22}$ dedicated to the drive axis and attenuators $b_{11}$, $b_{21}$, $b_{12}$ and $b_{22}$ dedicated to the sense axis. The drive axis includes attenuators $a_{11}$ and $a_{21}$ associated with $V_{Tx}$. Attenuators $a_{12}$ and $a_{22}$ are associated with $V_{Ty}$. The sense axis has attenuators $b_{11}$ and $b_{21}$ associated with $V_{thx}$ and attenuators $b_{12}$ and $b_{22}$ associated with $V_{thy}$.

The procedure for aligning the micro-gyroscope is as follows. Initially, transfer functions, before alignment, are used to determine the natural frequency of the drive mode, $Z_x$, aligned with the mechanical drive axis (x-axis) and the natural frequency of the sense mode, $Z_y$, aligned with the mechanical sense axis (y-axis). All alignment coefficients, i.e. attenuators, are set to nominal values, i.e. $a_{ii}=b_{ii}=1$. A multiplier, e2, is set to zero. All sum and difference functions should be verified to have no significant phase shifts at $Z_x$ and $Z_y$.

The drive axis alignment is accomplished by exciting $V_{Tx}$ with a sinusoidal voltage at frequency $Z_x$ and adjusting either $a_{11}$ or $a_{12}$ down from 1 until the $V_{thy}$ first harmonic component at $Z_y$ is at a minimum. $V_{Ty}$ is then excited with sinusoidal voltage at frequency $Z_x$ and $a_{21}$ or $a_{22}$ are adjusted down from 1 until the $V_{thx}$ first harmonic component at $Z_x$ is a minimum.

For sense axis alignment, $V_{Ty}$ is excited with sinusoidal voltage at frequency $Z_x$ and $b_{11}$ or $b_{12}$ are adjusted down from 1 until the $V_{thy}$ first harmonic component at $Z_y$ is at a minimum. Excite $V_{Ty}$ with sinusoidal voltage at frequency $Z_y$ and adjust $b_{21}$ or $b_{22}$ down from 1 until $V_{thx}$ first harmonic component is at a minimum.

The steps of exciting $V_{Tx}$ and $V_{Ty}$ for the sense and drive axes can be repeated for refined alignment if desired. A second harmonic component may be observed on $V_{thx}$ and can be canceled electronically. For example, squaring the drive signal $V_{thx}$ and subtracting a fraction e2 of the squared signal from $V_{thy}$ will cancel the second harmonic component.

Figure 2:
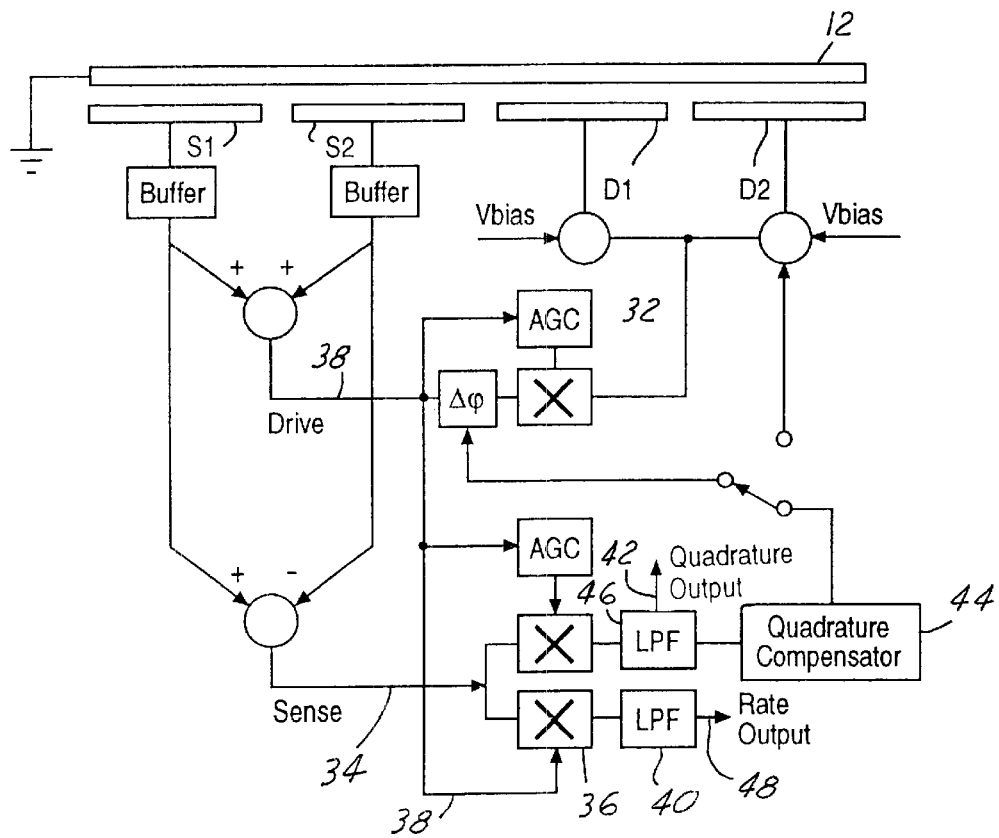
FIG. 2 is a block diagram of the quadrature compensation of a cloverleaf micro-gyroscope according to the present invention.

Referring to FIG. 2, there is shown a block diagram of the electronic tuning circuit 30 of the present invention. The two orthogonal rocking modes are inherently closely tuned by virtue of mechanical design and symmetry and precise manufacture. However, this tuning is often not sufficiently precise. Slight temperature or pressure variations may lead to tuning or alignment variations and bias drift. The automatic electronic compensation based on quadrature error that is applied according to the present invention, corrects for these variations in a rocking mode gyroscope and reduces noise and bias drift.

The drive axis is driven into oscillation, in any appropriate manner. In the present example, this is accomplished by an automatic gain control (AGC) loop 32. The drive frequency is adjusted until the gyroscope is effectively tuned, i.e. the sense axis motion is in phase with the drive axis motion for a fixed input rate. The drive frequency may be adjusted by adjusting the electronic phase shift 3 ∍Mwithin the AGC loop 32.

The sense axis (y-axis) signal 34, (S1–S2 for the four leaf cloverleaf), is demodulated 36 using the drive axis motion signal 38 (S1+S2) as a reference. This in-phase signal is filtered 40 to remove harmonics and is proportional to the input rate.

The output 42 of a quadrature compensator 44 is filtered 46 and used to apply an automatic proportional adjustment to the AGC loop phase, ∍M with polarity and gain empirically selected to null the quadrature output. The rate of the output bias drift is reduced.

Figure 3:
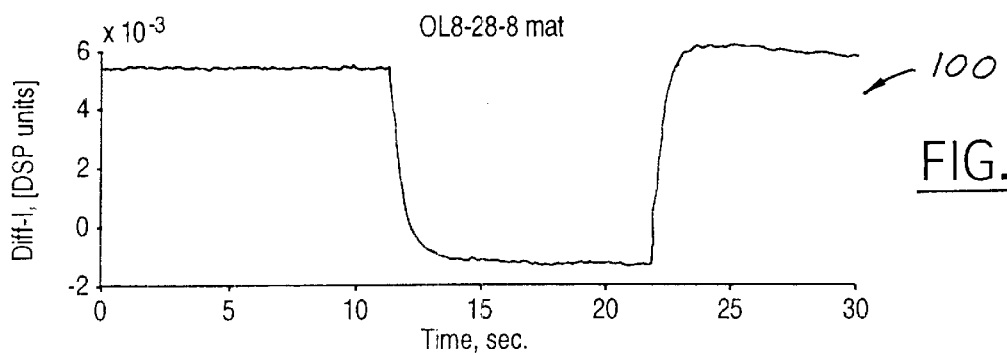
FIG. 3a is a graph of the in-phase signal for a 1 deg./sec step using the aligning and tuning electronics of the present invention.
FIG. 3b is a graph of the quadrature signal for a 1 deg./sec step using the aligning and tuning electronics of the present invention.
Figure 3:
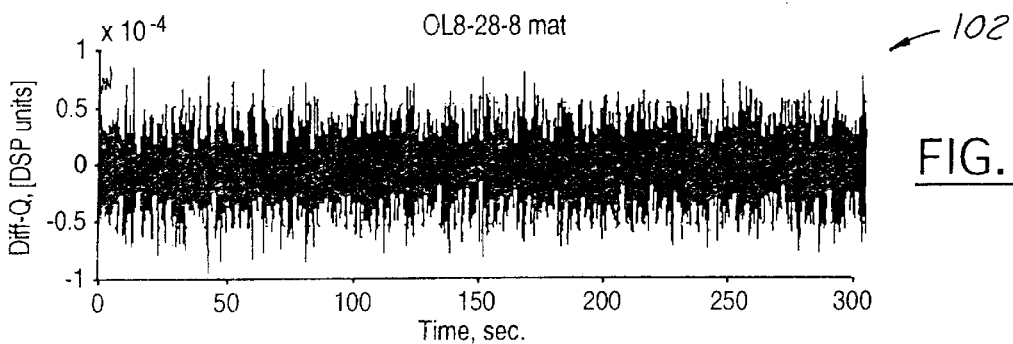

FIGS. 3a, 3b, 4a, and 4b demonstrate the results of experiments using the alignment and tuning procedures of the present invention. The quadrature signal was nulled over many hours using feedback proportional to the quadrature signal and its integral. The in-phase signal 100 of the rate output of the gyroscope (48 in FIG. 2) and quadrature signal 102 or quadrature output (44 in FIG. 2) are plotted in FIGS. 3a and 3b respectively for a 1 deg./sec step. For the step in FIG. 3a, the quadrature output 102 in FIG. 3b shows the gyroscope remains aligned and tuned.

Figure 4:
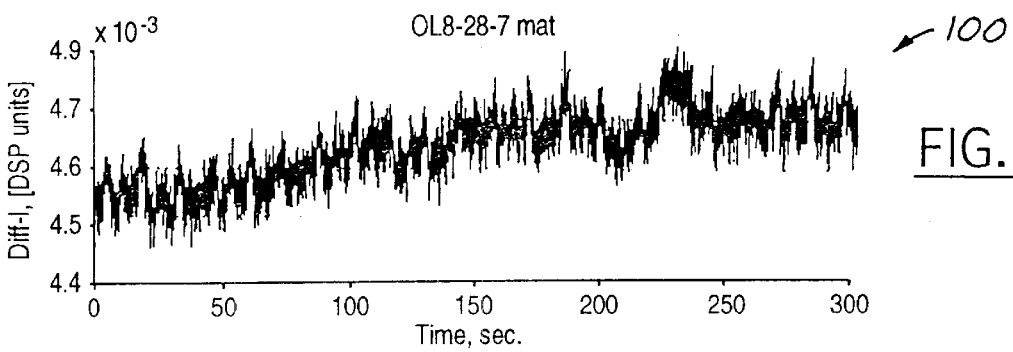
FIG. 4a is a graph of the in-phase signal during quiescent monitoring using the aligning and tuning electronics of the present invention.
FIG. 4b is a graph of the quadrature signal during quiescent monitoring using the aligning and tuning electronics of the present invention.
Figure 4:
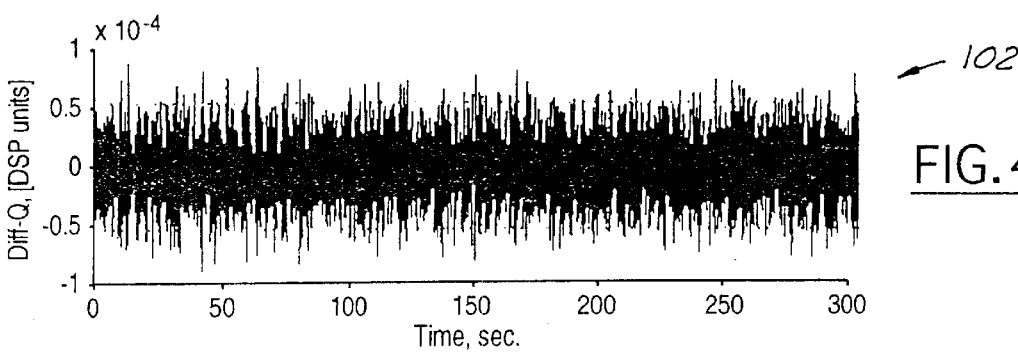

The in-phase signal 100 and quadrature signal 102 are plotted during a long quiescent monitoring in FIGS. 4a and 4b. The quadrature signal 102 shows the gyroscope remains aligned and tuned.

It should be noted that while the present invention is being described in a preferred embodiment, it is possible to modify the present invention without departing from the scope of the appended claims.

What is claimed is:

1. A micro-gyroscope having a resonator having mechanical x and y axes, said micro-gyroscope comprising:

a plurality of electrodes spaced about a central hub and having electrical outputs, at least two electrodes on one side of said mechanical x axis being drive electrodes, and at least two electrodes on the other side of said x axis being sense electrodes, said resonator spaced from and located above said plurality of electrodes, whereby motion of said resonator is induced by said drive electrodes and sensed by said sense electrodes; and a control circuit for aligning said electrical output of said electrodes with said mechanical axes, said control circuit electronically transforms control and sense voltages for said micro-gyroscope to eliminate a first harmonic signal.

2. The micro-gyroscope as claimed in claim 1 wherein said control circuit further comprises a network of attenuators being adjustable for eliminating a first harmonic at a predetermined frequency.

3. The micro-gyroscope as claimed in claim 2 further comprising a least one attenuator on said drive signal and at least one attenuator on said sense signal.

4. The micro-gyroscope as claimed in claim 2 further comprising a least one attenuator for canceling a second harmonic on a drive signal.

5. The micro-gyroscope as claimed in claim 1 further comprising a control circuit for tuning two orthogonal rocking modes on said micro-gyroscope, said control circuit having an automatic gain control loop.

6. The micro-gyroscope as claimed in claim 5 wherein said control circuit further comprises a quadrature compensator for adjusting a phase of said automatic gain control loop to eliminate quadrature in said control circuit.

7. A method for electronically aligning a micro-gyroscope having a network of attenuators, said method comprising the steps of:

determining the natural frequencies of the drive and sense modes $Z_x$ and $Z_y$ aligned with the mechanical drive axis and the mechanical sense axis;

setting all attenuators to nominal values;

verifying that all sum and difference functions in the micro-gyroscope control circuit have no significant phase shifts at $Z_x$ and $Z_y$;

aligning an electrical output of said drive electrodes by adjusting a predetermined attenuator in said network of attenuators; and aligning an electrical output of said sense electrodes by adjusting a predetermined attenuator in said network of attenuators.

8. The micro-gyroscope as claimed in claim 7 wherein said step of aligning said electronic output of said drive electrodes further comprises the steps of:

exciting a first drive electrode with a sinusoidal voltage at frequency $Z_y$, adjusting said predetermined attenuator until a first harmonic component of a sense signal is at a minimum;

exciting a second drive electrode with a sinusoidal voltage at a frequency $Z_x$; and adjusting said predetermined attenuator until a first harmonic component of a second sense signal is at a minimum.

9. The method as claimed in claim 8 wherein said steps of exciting a first and second drive electrode and adjusting an attenuator are repeated for refined alignment.

10. The method as claimed in claim 8 wherein said step of aligning said sense electrodes further comprises the steps of:

exciting a first drive electrode with a sinusoidal voltage at frequency $Z_x$;

adjusting said predetermined attenuator until a first harmonic component of a sense signal is at a minimum;

exciting a second drive electrode with a sinusoidal voltage at a frequency $Z_y$; and adjusting said predetermined attenuator until a first harmonic component of a second sense signal is at a minimum.

11. The method as claimed in claim 10 wherein said steps of exciting a first and second drive electrode and adjusting said predetermined attenuator are repeated for refined alignment.

12. The method as claimed in claim 7 further comprising the step of electronically canceling a second harmonic component on said first sense electrode.

13. The method as claimed in claim 12 wherein said step of electronically canceling a second harmonic component further comprises the steps of:

squaring the drive signal; and subtracting a fraction of said squared signal from said sensed signal.

* * * * *